United States Patent
Roberts et al.

(10) Patent No.: US 9,588,614 B2
(45) Date of Patent: Mar. 7, 2017

(54) TOUCH SENSORS AND TOUCH SENSING METHODS

(71) Applicant: TouchNetix Limited, Hampshire (GB)

(72) Inventors: Stephen William Roberts, Winchester (GB); Peter Timothy Sleeman, Fareham (GB); Christopher Kyle Ard, Chandlers Ford (GB)

(73) Assignee: TouchNext Limited, Hampshire (GB)

( * ) Notice: Subject to any disclaimer, the term of this patent is extended or adjusted under 35 U.S.C. 154(b) by 0 days.

(21) Appl. No.: 14/433,044

(22) PCT Filed: Oct. 8, 2013

(86) PCT No.: PCT/GB2013/052615
§ 371 (c)(1),
(2) Date: Apr. 2, 2015

(87) PCT Pub. No.: WO2014/057253
PCT Pub. Date: Apr. 17, 2014

(65) Prior Publication Data
US 2015/0234527 A1 Aug. 20, 2015

(30) Foreign Application Priority Data
Oct. 8, 2012 (GB) .................................. 1217947.9

(51) Int. Cl.
*G06F 3/044* (2006.01)
*G06F 3/041* (2006.01)
(52) U.S. Cl.
CPC ............ *G06F 3/0416* (2013.01); *G06F 3/044* (2013.01); *G06F 2203/04111* (2013.01)
(58) Field of Classification Search
CPC ........ G06F 3/041; G06F 3/0416; G06F 3/044; G06F 2203/04111
(Continued)

(56) References Cited

U.S. PATENT DOCUMENTS 7,395,717 B2 * 7/2008 DeAngelis .............. G01L 1/146 73/724
7,578,195 B2 * 8/2009 DeAngelis .............. G01L 1/146 324/687

(Continued)

FOREIGN PATENT DOCUMENTS

WO 2007/094993 A1 8/2007
WO 2007/146785 A2 12/2007
WO 2009/132146 A1 10/2009

OTHER PUBLICATIONS

International Search Report and Written Opinion for corresponding patent application No. PCT/GB2013/052615 dated Dec. 12, 2013.
(Continued)

*Primary Examiner* — Vijay Shankar
(74) *Attorney, Agent, or Firm* — Renner, Otto, Boisselle & Sklar, LLP (57) ABSTRACT

A touch-sensitive position sensor is disclosed. The sensor comprises an array of first electrodes and an array of second electrodes arranged in a pattern to provide a sensing surface, wherein at least some of the first electrodes and the second electrodes are arranged to follow paths which are non-linear within the sensing surface such that there are ends of the first electrodes and ends of the second electrodes which meet a common edge of the sensing surface. A controller is coupled to respective ones of the first electrodes and the second electrodes and arranged to determine a reported position for an object adjacent the sensing surface by measuring changes in an electrical parameter e.g. capacitance or resistance, associated with the first electrodes and the second electrodes which is caused by the presence of the object. The controller is further operable to provide an indication of the reported position in a first coordinate system defined relative to the first electrodes and the second electrodes, the sensor further comprises a processor arranged to receive the indication of
(Continued)

reported position from the controller in the first coordinate system and to transform the reported position to an output position in a second coordinate system, wherein the transform is based on the non-linear pattern of electrodes. Thus, a sensor having electrodes which are distorted so as to meet a common edge may be provided for ease of connectability, with the distortion been accounted for through the transform performed by the processor.

12 Claims, 8 Drawing Sheets

(58) Field of Classification Search
USPC .................................................. 345/173–179
See application file for complete search history.

(56) References Cited

U.S. PATENT DOCUMENTS

| | | | |
|---|---|---|---|
| 2007/0248799 A1* | 10/2007 | DeAngelis | ............. G01L 1/146 428/209 |
| 2008/0127739 A1* | 6/2008 | DeAngelis | ............. G01L 1/146 73/718 |
| 2009/0002337 A1 | 1/2009 | Chang | |
| 2011/0227868 A1 | 9/2011 | Chen et al. | |

OTHER PUBLICATIONS

Search and Examination Report for corresponding GB Application No. 1217947.9 dated Feb. 1, 2013.

* cited by examiner

TOUCH SENSORS AND TOUCH SENSING METHODS

This application is a national phase of International Application No. PCT/GB2013/052615 filed Oct. 8, 2013 and published in the English language.

BACKGROUND OF THE INVENTION

The present invention relates to the field of touch sensors, including touch screens and touch pads, and their associated control chip(s). In particular, embodiments of the invention relate to designs for electrode patterns for such sensors for aiding connectability.

A capacitive touch sensor can be generalised as one that uses a physical sensor element comprising an arrangement of electrically conductive electrodes extending over a touch sensitive area (sensing area) and a controller chip connected to the electrodes and operable to measure changes in the electrical capacitance of each of the electrodes or the mutual-capacitance between combinations of the electrodes.

Figure 1:
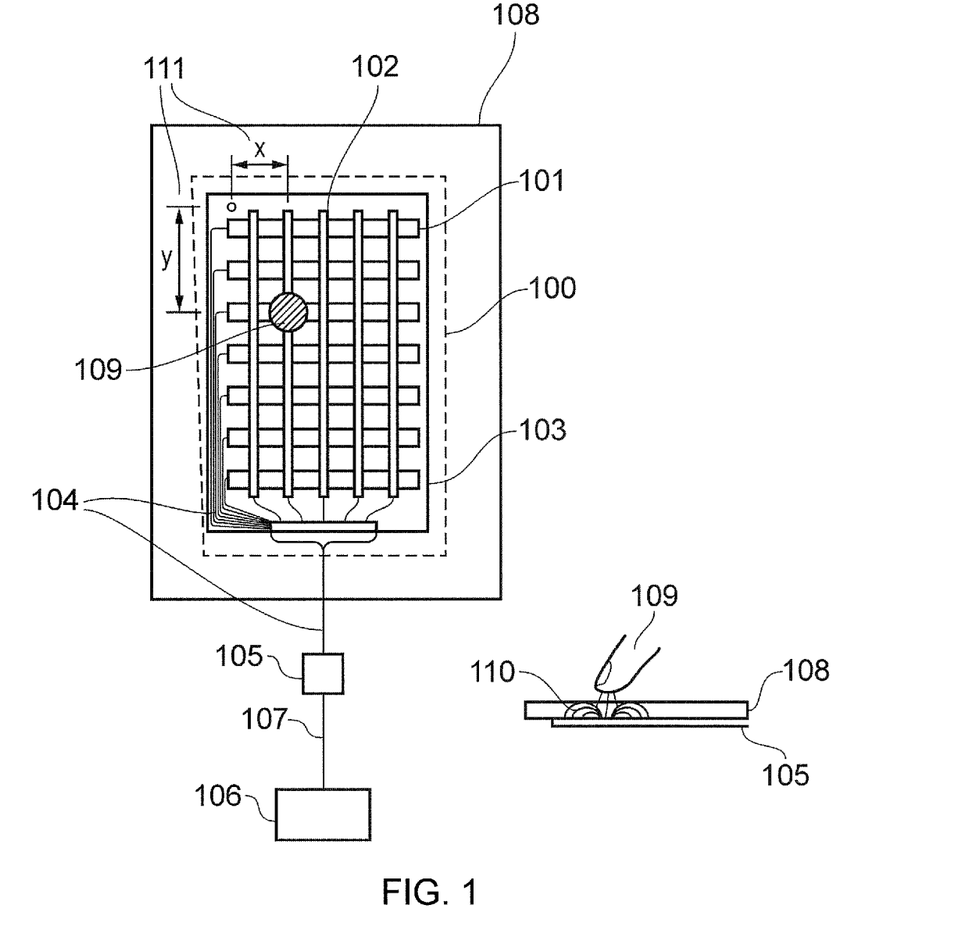
FIG. 1 illustrates a typical touchscreen/touch sensor system.

FIG. 1 schematically shows principal components of a generic conventional capacitive touchscreen comprising a physical sensor element 100. The touch screen is represented in plan view (to the left in the figure) and also in cross-sectional view (to the right in the figure).

The touch screen is configured for establishing the position of a touch within a two-dimensional sensing area by providing Cartesian coordinates along an x-direction (horizontal in the figure) and a y-direction (vertical in the figure). In this example the sensor element 100 is constructed from a substrate 103 that could be glass or plastic or some other insulating material and upon which is arranged an array of electrodes consisting of multiple laterally extending parallel electrodes, x-electrodes 101, and multiple vertically extending parallel electrodes, y-electrodes 102, which in combination allow the position of a touch 109 to be determined. To clarify the terminology, and as will be seen from FIG. 1, the x-electrodes 101 are aligned parallel to the x-direction and the y-electrodes 102 are aligned parallel to the y-direction. Thus the different x-electrodes allow the position of a touch to be determined at different positions along the y-direction while the different y-electrodes allow the position of a touch to be determined at different positions along the x-direction. That is to say in accordance with the terminology used herein, the electrodes are named after their direction of extent rather than the direction along which they resolve position.

In some cases, each electrode may have a more detailed structure than the simple "bar" structures represented in FIG. 1, but the operating principles are broadly the same. The electrodes, which are sometimes called traces, are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided in lieu of a mouse in laptop computers is usually opaque, and hence can use lower cost copper electrodes and an epoxy-glass-fibre substrate (e.g. FR4). Referring back to the figure, the electrodes are electrically connected via circuit conductors 104 to a controller chip 105, which is in turn connected to a host processing system 106 by means of a communication interface 107. The host 106 interrogates the controller chip 105 to recover the presence and coordinates of any touch or touches present on, or proximate to the sensor 103.

In the example, a front cover (also referred to as a lens or panel) 108 is positioned in front of the sensor 103 and a single touch 109 on the surface of the cover 108 is schematically represented.

Note that the touch itself does not generally make direct galvanic connection to the sensor 103 or to the electrodes 102. Rather, the touch influences the electric fields 110 that the controller chip 105 generates using the electrodes 102. With appropriate analysis of relative changes in the electrodes' measured capacitance/capacitive coupling, the controller chip 105 can thus calculate a touch position on the cover's surface as an XY coordinate 111. The host system can therefore use the controller chip to detect where a user is touching, and hence take appropriate action, perhaps displaying a menu or activating some function.

There are many different material combinations and electrode configurations to allow creation of a touch screen and the example discussed above is just one.

A further aspect of capacitive touch sensors relates to the way the controller chip uses the electrodes of the sensor element to make its measurements. There are two main classes of controller in this regard.

Figure 2:
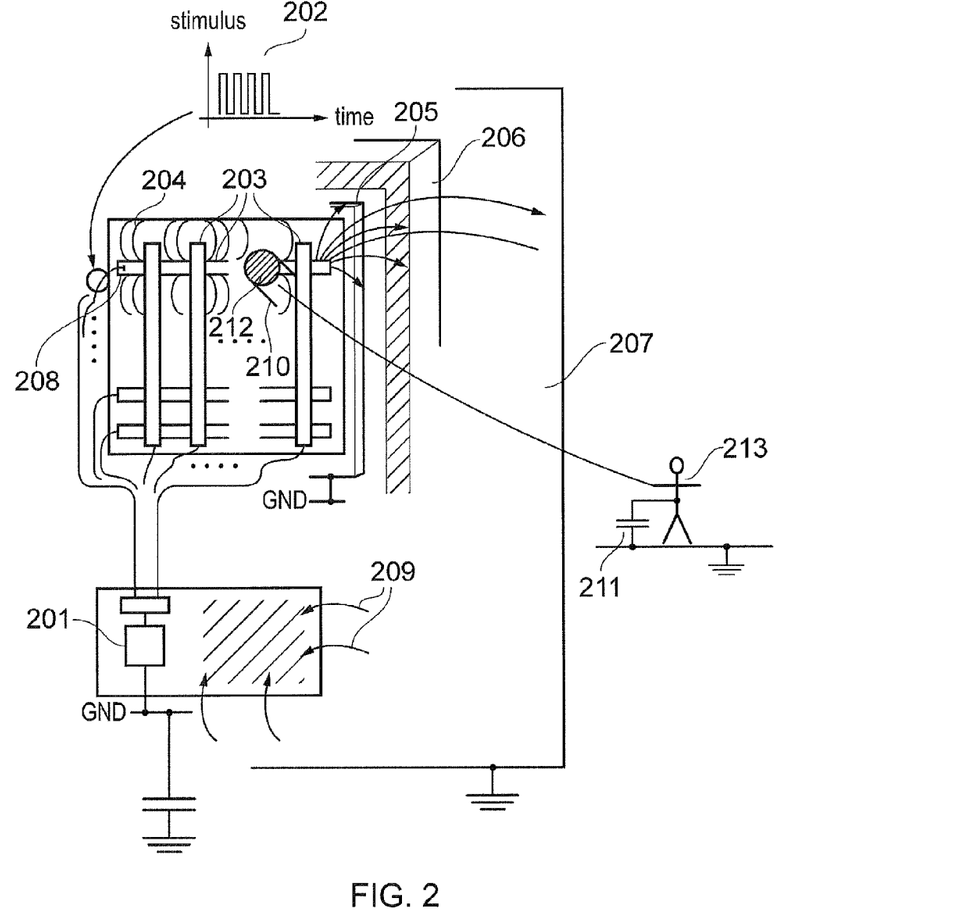
FIG. 2 illustrates a typical self-capacitance type touchscreen system.

A first class is known as a "self-capacitance" style. Reference is made to FIG. 2. In this design of a capacitive sensor, the controller 201 will typically apply some electrical stimulus (drive signal) 202 to each electrode 203 which will cause an electric field to form around it 204. This field couples through the space around the electrode back to the controller chip via numerous conductive return paths that are part of the nearby circuitry 205, product housing 206, physical elements from the nearby surroundings 207 etc., so completing a capacitive circuit 209. The overall sum of return paths is typically referred to as the "free space return path" in an attempt to simplify an otherwise hard-to-visualize electric field distribution. The important point to realise is that the controller is only driving each electrode from a single explicit electrical terminal 208; the other terminal is the capacitive connection via this "free space return path". The capacitance measured by the controller is the "self-capacitance" of the electrode (and connected tracks) relative to free space (or Earth as it is sometimes called) i.e. the "self-capacitance" of the electrode. Touching or approaching the electrode with a conductive element 210, such as a human finger, causes some of the field to couple via the finger through the connected body 213, through free space and back to the controller. This extra return path 211 can be relatively strong for large objects (such as the human body), and so can give a stronger coupling of the electrode's field back to the controller; touching or approaching the electrode hence increases the self-capacitance of the electrode. The controller is configured to sense this increase in capacitance. The increase is strongly proportional to the area 212 of the applied touch and is normally weakly proportional to the touching body's size (the latter typically offering quite a strong coupling and therefore not being the dominant term in the sum of series connected capacitances).

In a classic self-capacitance sensor the electrodes are arranged on an orthogonal grid, generally with a first set of electrodes on one side of a substantially insulating substrate and the other set of electrodes on the opposite side of the substrate and oriented at nominally 90° to the first set. There are also structures where the grid is formed on a single side of the substrate and small conductive bridges are used to allow the two orthogonal sets of electrodes to cross each other without short circuiting. One set of electrodes is used to sense touch position in a first axis that we shall call "X"

and the second set to sense the touch position in the second orthogonal axis that we shall call "Y".

In a self-capacitance touch sensor, the controller can either drive each electrode in turn (sequential) or it can drive them all in parallel. In the former sequential case, any neighbouring electrodes to a driven electrode are sometimes grounded by the controller to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the controller can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the controller if there is a voltage difference between the electrodes).

Figure 3:
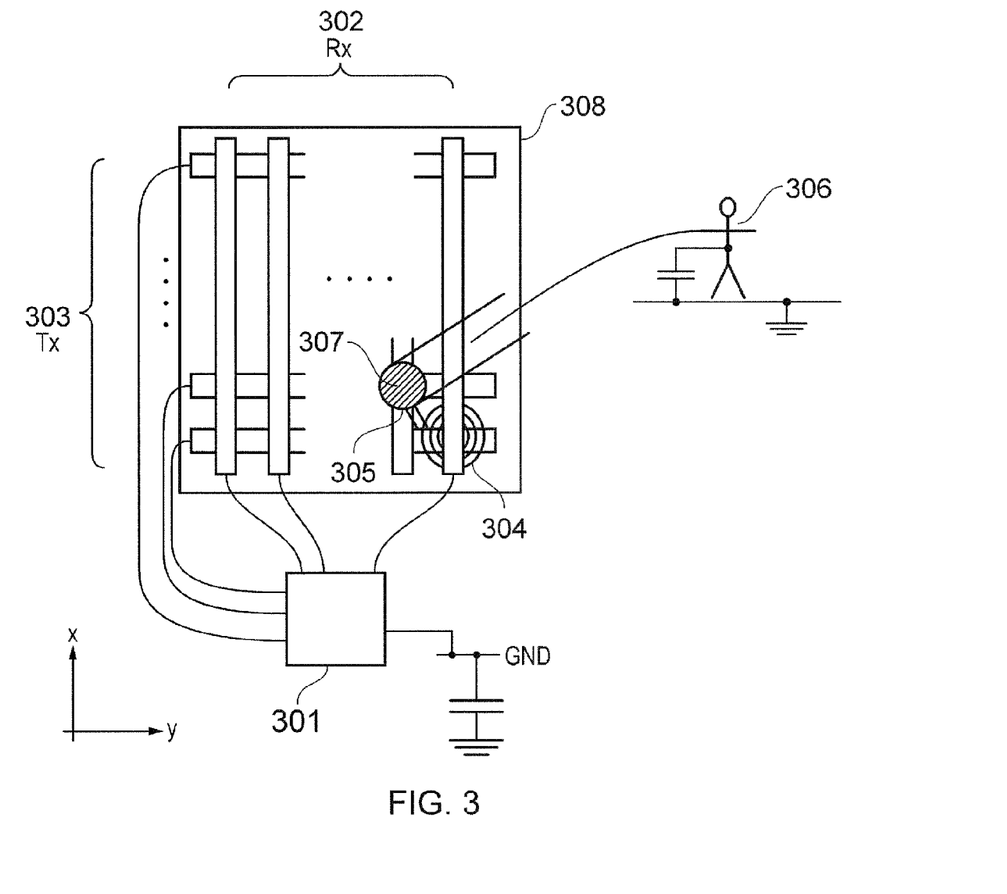
FIG. 3 illustrates a typical mutual-capacitance type touchscreen system.

The second class of controller is known as a "mutual-capacitance" style. Reference is made to FIG. 3. In this design of a capacitive sensor the controller 301 will sequentially stimulate each of an array of transmitter (driven/drive) electrodes 302 that are coupled by virtue of their proximity to an array of receiver electrodes 303. The resulting electric field 304 is now directly coupled from the transmitter to each of the nearby receiver electrodes; the "free space" return path discussed above plays a negligible part in the overall coupling back to the controller chip when the sensor is not being touched. The area local to and centred on the intersection of a transmitter and a receiver electrode is typically referred to as a "node". Now, on application or approach of a conductive element 305 such as a human finger, the electric field 304 is partly diverted to the touching object 305. An extra return path to the controller 301 is now established via the body 306 and "free-space" in a similar manner to that described above. However, because this extra return path acts to couple the diverted field directly to the controller chip 301, the amount of field coupled to the nearby receiver electrode 303 decreases. This is measured by the controller chip 301 as a decrease in the "mutual-capacitance" between that particular transmitter electrode and receiver electrodes in the vicinity of the touch. The controller senses this change in capacitance of one or more nodes. The magnitude of a capacitance change is nominally proportional to the area 307 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

In a classic mutual-capacitance sensor the transmitter electrodes and receiver electrodes are arranged as an orthogonal grid, with the transmitter electrodes on one side of a substantially insulating substrate and the receiver electrodes on the opposite side of the substrate. This is as schematically shown in FIG. 3. It should be understood that discussion of a single unitary substrate does not preclude use of a multi-layer substrate which can sometimes be advantageous for cost, ease of fabrication or for other reasons. In FIG. 3 a first set of transmitter electrodes 303 is shown on one side of a substantially insulating substrate 308 and a second set of receiver electrodes 302 is arranged at nominally 90° to the transmitter electrodes on the other side of the substrate. There are also structures where the grid is formed on a single side of the substrate and small insulating bridges are used to allow the transmitter and receiver electrodes to cross each other without short circuiting.

By using interpolation between adjacent nodes for both types of capacitive touch sensor a controller chip can typically determine touch positions to a greater resolution than the spacing between electrodes. Also there are established techniques by which multiple touches within a sensing area, and which might be moving, can be uniquely identified and tracked, for example until they leave the sensing area.

It will be appreciated that conventional position-sensitive touch sensors are generally configured to provide a position measurements as a Cartesian coordinate within a two-dimensional sensing space which is defined relative to the x- and y-electrodes. Accordingly, commercially-available capacitive sensing controller chips (ICs) are generally designed to interface to regular linear arrays of straight sensor electrodes, or X and Y electrodes, on a two-dimensional plane.

The inventors have recognised that in some cases a conventional electrode layout coupled to a conventional controller may not be appropriate. This might be, for example, because the design of the touch sensor, and in particular the sensing surface and surrounding connections, is constrained by its application and/or the form of a device into which the sensor is to be incorporated. In particular, in some situations it may be inconvenient or impossible to establish connections from a touch sensor controller chip (IC) to more than one side/edge of a sensing surface. For example, this may be due to a limited availability of space adjacent the sensing area in which to route connections to other edges of the sensing surface. In situations such as this it would be advantageous to employ a sensor having a sensing surface in which connections to the respective electrodes of the sensor may be made along only one of the edges of the sensing surface.

With the above issues in mind there is a need for alternative touch sensor designs for providing more flexibility in respect of providing connectability between sensor electrodes and associated control circuitry.

SUMMARY OF THE INVENTION

According to a first aspect of the invention there is provided a touch-sensitive position sensor comprising: an array of first electrodes and an array of second electrodes arranged in a pattern to provide a sensing surface, wherein at least some of the first electrodes and the second electrodes are arranged to follow paths which are non-linear within the sensing surface such that there are ends of the first electrodes and ends of the second electrodes which meet a common edge of the sensing surface; a controller coupled to respective ones of the first electrodes and the second electrodes and arranged to determine a reported position for an object adjacent the sensing surface by measuring changes in an electrical parameter associated with the first electrodes and the second electrodes which is caused by the presence of the object, and to provide an indication of the reported position in a first coordinate system defined relative to the first electrodes and the second electrodes; a processor arranged to receive the indication of reported position from the controller in the first coordinate system and to transform the reported position to an output position in a second coordinate system, wherein the transform is based on the nonlinear pattern of electrodes, and wherein the sensing surface spans a plurality of nodes at locations where respective ones of the first and second electrodes cross, and wherein the separations between adjacent nodes are different for different locations on the sensing surface.

According to some embodiments the processor is configured to transform the reported position to an output position based on a lookup table relating a plurality of possible reported positions to a plurality output positions.

According to some embodiments the processor is configured to transform the reported position to an output position according to a mathematical function associated with the pattern of electrodes.

According to some embodiments the common edge of the sensing surface is a first edge of the sensing surface and the ends of the first electrodes and ends of the second electrodes which meet the first edge of the sensing surface are first ends of respective ones of the first electrodes and first ends of respective ones of the second electrodes, and wherein second ends of the respective ones of the first electrodes meet a second edge of the sensing surface and second ends of the respective ones of the second electrodes meet a third edge of the sensing surface.

According to some embodiments at least one of first electrodes crosses with at least one of the second electrodes but does not cross with at least one other of the first electrodes.

According to some embodiments respective ones of the first electrodes and the second electrodes have a non-uniform width in the plane of the sensing surface which varies in dependence on a distance from the common edge of the sensing surface.

According to some embodiments respective ones of the first electrodes and the second electrodes have a non-uniform width in the plane of the sensing surface which varies in dependence on a distance along the selective electrodes between pairs of nodes.

According to some embodiments respective ones of the first electrodes and/or respective ones of the second electrodes follow generally arcuate paths within the sensing surface.

According to some embodiments the generally arcuate paths within the sensing surface subtend an angle of around 90°.

According to some embodiments the electrical parameter relates to a capacitive coupling associated with the respective electrodes.

According to some embodiments the capacitive coupling is a capacitive coupling between respective ones of the first electrodes and respective ones of the second electrodes.

According to some embodiments the electrical parameter relates to a resistance associated with the electrodes.

Embodiments of the invention may thus provide a method and apparatus for recovering physical touch positions on a two-layer sensor, e.g. a rectangular sensor, from positions reported by a touch controller in the case where the distances between neighbouring sensor nodes are unequal.

In accordance with some embodiments there is a closed form mathematical relation between the positions of the touches reported by the touch controller and the true physical positions on the sensor.

In accordance with some embodiments there is a lookup table used to determine the positions of the nearest nodes on the sensor from position reported by the touch controller and further refinement of position is determined by interpolating between these nodes.

In accordance with some embodiments all connections can be made on one edge of the sensor.

In accordance with some embodiments the mathematical relation is chosen to minimise the maximum nearest-neighbour distance of any node (location where electrodes meet or cross) within a sensor.

In accordance with some embodiments the sensor has two classification of sensor electrodes/lines, which may be referred to D lines (comprising an array of first electrodes) and R lines (comprising an array of second electrodes), and the sensor may comprise uniform width D lines and uniform width R lines with the resulting sensor nodes being formed at the centre of the crossings between each D line and each R line.

In accordance with some embodiments the sensor consists of non-uniform width D lines and non-uniform width R lines with the resulting sensor nodes being formed at the centre of the crossings (intersections) between each D line (first electrode) and each R line (second electrode).

In accordance with some embodiments the D lines and R lines are shaped differently in the vicinity of each crossing such that the mutual capacitance between the respective D lines and R lines at the respective intersections between respective ones of the lines are similar.

BRIEF DESCRIPTION OF THE DRAWINGS

The invention is now described by way of example only with reference to the following drawings in which.

DETAILED DESCRIPTION

In touch-sensor applications there is often a desire to provide a sensing surface that which is as large as possible within a defined space. For example, there is often a desire for a large touch-sensitive surface to be provided within a relatively compact device, such as a handheld computer/tablet or mobile phone, for example. However, with established techniques there is generally a requirement for a "dead" region surrounding a touch sensitive surface that is needed for routing electrical connections to the various electrodes comprising the sensing surface. For example, for the conventional sensor schematically represented in FIG. 3 there is a need for traces to run down the left-hand side of the sensing surface to connect to the horizontally-aligned electrodes. This restricts the extent to which the sensor can extend across the full width of a device in which it is incorporated. Because of this there can be a desire to simplify the manner in which electrical connections can be made to a sensing surface.

Some embodiments of the invention are directed towards addressing this issue by providing sensor electrode patterns that provide a sensing surface for which connections to the electrodes which define the sensing surface can be made along one edge of the active sensing surface (i.e. the surface over which the sensor is able to report positions). In broad summary, this can be achieved in accordance with some embodiments of the invention by in effect providing a distorted electrode pattern comprising electrodes that are non-linear within the sensing surface so that electrodes which meet (intersect/cross) one another within the sensing surface nonetheless meet a common edge of the sensing surface. Because of the distorted electrode pattern a position determination made using a conventionally operating touch sensor controller chip coupled to the electrodes will report a position that does not directly correspond to a true physical position adjacent the sensing surface. However, the reported position determined with respect to the distorted electrode pattern may be post-processed to convert it to a physical location, wherein the post-processing takes account of the nature of the distorted electrode pattern (i.e. a transform may be applied to "undo" the effects of the electrode pattern being distorted).

Within the context of embodiments of the invention two coordinate systems may be considered.

One coordinate system may be referred to as a "physical" coordinate system and relates to the "real world" position of an object adjacent a sensing surface. For example, a physical coordinate system may be used to represent the position of a touch adjacent a two dimensional sensing surface in terms of a number of centimeters away from a reference point along two directions.

Another coordinate system may be referred to as a "reported" coordinate system and relates to the position of an object adjacent a sensing surface as reported in a coordinate system defined relative to the sensor electrodes. For example, a reported coordinate system may be used to represent the position of a touch in terms of which sensor electrodes are in the vicinity of where the touch is detected. A controller for a sensor chip will typically output a position in such a "reported" coordinate system (since the controller will naturally calculate positions relative to the electrodes).

Referring to FIG. 1 by way of example, the (interpolated centroid) position of the touch 109 may be defined within a physical coordinate system as being at a position of 2.4 centimeters from the left-hand edge of the sensing area and 3.6 centimeters from the top edge of the sensing area. Thus in this example the physical coordinate system is a regular Cartesian coordinate system having an origin at the top left corner of the sensing area and with distance is measured in units of centimeters (of course other origins and units may be used).

Alternatively, the (interpolated centroid) position of the touch 109 may equally be defined within a reported coordinate system as being around the intersection of the third-from-top x-electrode and the second-from-left y-electrode. Thus in this example the reported coordinate system is again a regular Cartesian coordinate system having an origin at the top left corner of the sensing area and with distance is measured in units of electrode separations. It will be appreciated that in general a controller chip will not typically output a reported position that literally uses electrode separations as units, but rather will most likely be configured to output a digitised value for each sensing direction, for example ranging from 0 to 1023 corresponding to the full extent of the sensing area in the relevant direction, wherein the digitised value.

In some respects the physical coordinate system may be seen as defining the location of a touch in "real space" whereas the reported coordinate system may be seen as defining the location of a touch in "controller space" or "reported space". For a conventional electrode pattern and controller chip, such as represented in FIG. 1, the relationship between the physical (or real-world) coordinate system and the reported (or controller) coordinate system is based around a simple linear scaling of the units use to define position (and a translational offset if different origins are employed). Thus a location $(x_r, y_r)$ in the controller's reported coordinate system may be transformed into a location $(x_p, y_p)$ within the sensing surface's physical coordinate system by simply multiplying $x_r$ and $y_r$ by a scaling factor based on how physically far apart the respective electrodes are.

In accordance with some embodiments of the invention touch sensitive position sensors are provided having electrode patterns which are not arranged on a regular Cartesian grid. For example, electrode patterns are provided which comprise an array of first electrodes and an array of second electrodes arranged to provide a sensing surface comprising sensing nodes at locations where respective ones of the first electrodes and the second electrodes meet/intersect/cross, and wherein at least some of the first electrodes and/or the second electrodes are non-linear (i.e. arrange to follow a generally non-linear path, such as a curve) within the sensing area. As a consequence of these configurations, the positions of touches (objects) determined by a conventional sensor controller coupled to the sensor electrode pattern in reported coordinate space differ from the physical positions of the touches relative to the physical sensing surface by more than a simple linear scaling. As explained further below, the approach of embodiments of the invention has been found to provide alternative electrode patterns having characteristics which can address some of the issues identified above.

Figure 4:
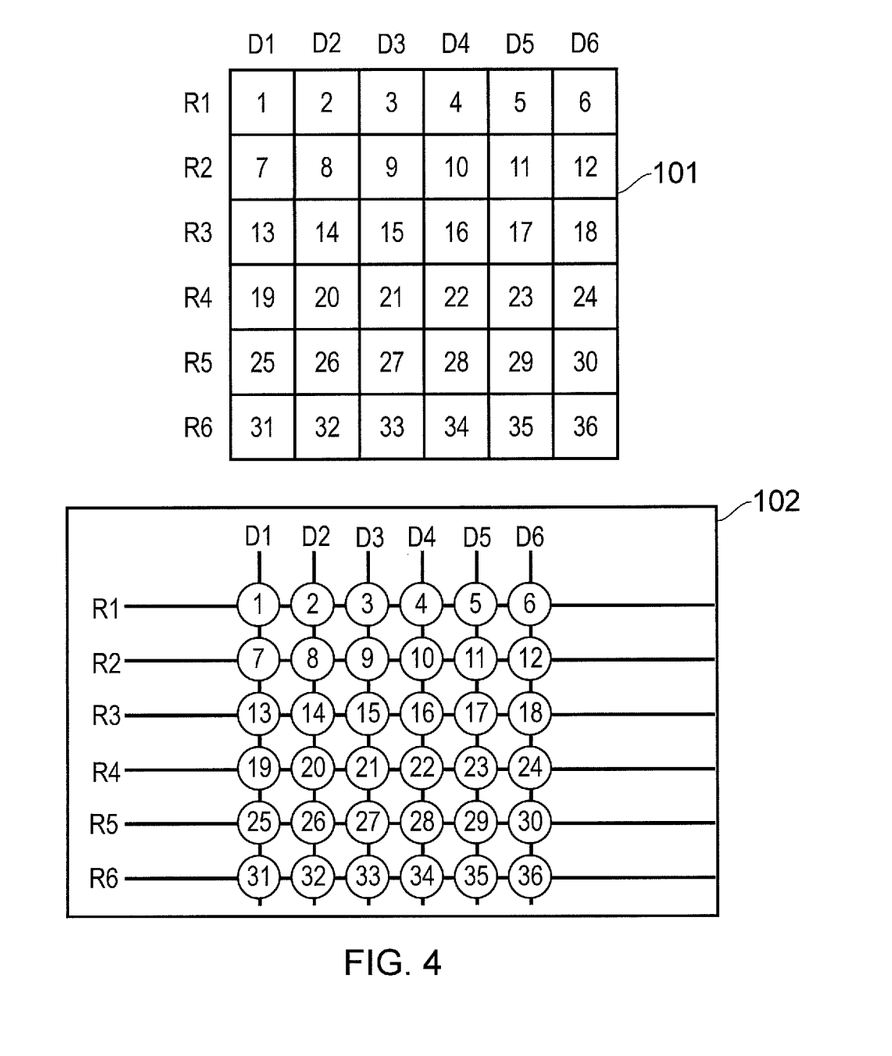
FIG. 4 schematically shows some aspects of a conventional capacitive touch sensor including a schematic array of electrodes and a coordinate space for reported positions relative to the electrodes.

FIG. 4 schematically shows various aspects of a conventional capacitive touch sensor. In this example the capacitive touch sensor is assumed to be based on a mutual-capacitance sensing technique in which a sensing surface 102 is defined by an orthogonal grid of six "receive" electrodes (labelled R1 to R6) and six "drive" electrodes (labelled D1 to D6), as schematically represented in the lower part of FIG. 4. These electrodes may be coupled to a conventional touch sensor controller configured to appropriately apply signals to the drive electrodes D1 to D6 and to measure corresponding signals received on the receiver electrodes R1 to R6 in the usual way. As is well established, this type of sensor is primarily sensitive to the location of objects in the vicinity of the respective intersections between the receive electrodes and the drive electrodes. In this regard, the sensing surface may be considered to comprise 36 sensing nodes corresponding to the various intersection/crossing/meeting points as labelled in the figure. The presence of an object near to a given sensing node will cause a change in the mutual-capacitance between the respective drive and receiver electrodes in the vicinity of this node. A centroid of changes in the mutual-capacitance for a group of sensing nodes may be interpolated to establish a touch position with a precision that is higher than the characteristic electrode spacing.

The upper part of FIG. 4 schematically represents the reported position coordinate system for the controller coupled to the sensor. Here the controller is operable to output an indication of the position of an object relative to the locations of the various sensing nodes (i.e. in a coordinate system defined relative to the electrodes). There are various ways in which the position may be reported. For example, an object identified as being exactly above node 17 might be identified as having coordinates $(x_r, y_r) = (5, 3)$. Here $x_r$ is a measure of where the object/touch is determined to be relative to the drive electrodes (i.e. $x_r = 5$ indicates the position of the touch in the x-direction of the reported coordinate system is directly above drive electrodes D5) while $y_r$ is a measure of where the object/touch is determined to be relative to the receive electrodes (i.e. $y_r = 3$ indicates the position of the object/touch in the y-direction of the reported coordinate system is directly above receive electrodes R3). As noted above, it is well established that conventional controllers can "interpolate" positions. Thus an object having a location determined to be midway between nodes 28, 29, 34 and 35 might be reported by the controller as having coordinates $(x_r, y_r) = (4.5, 5.5)$ in reported coordinate space (i.e. the coordinate space defined relative to the electrodes).

As discussed above, the relationship between the reported position for an object $(x_r, y_r)$ in reported coordinate space and the actual/physical position of an object within the sensing surface in physical space $(x_p, y_p)$ is generally a simple linear scaling based around the size of the spacing between electrodes.

Embodiments of the invention will now be described which are assumed to be based around a mutual-capacitance touch sensor comprising six drive electrodes and six receive electrodes and which may be controlled by a conventional controller such as one which may be used in conjunction with the conventional Cartesian-grid electrode layout shown in FIG. 4. However, as will be apparent, a significant aspect of embodiments of the invention is that the electrodes are non-linear within the plane of the sensing surface. Nonetheless, in accordance with embodiments of the invention a sensing surface having non-linear electrodes may be coupled to a broadly conventional-type controller (i.e. a controller that does not "know" the electrodes are not arranged on a conventional regular Cartesian grid).

Figure 5A:
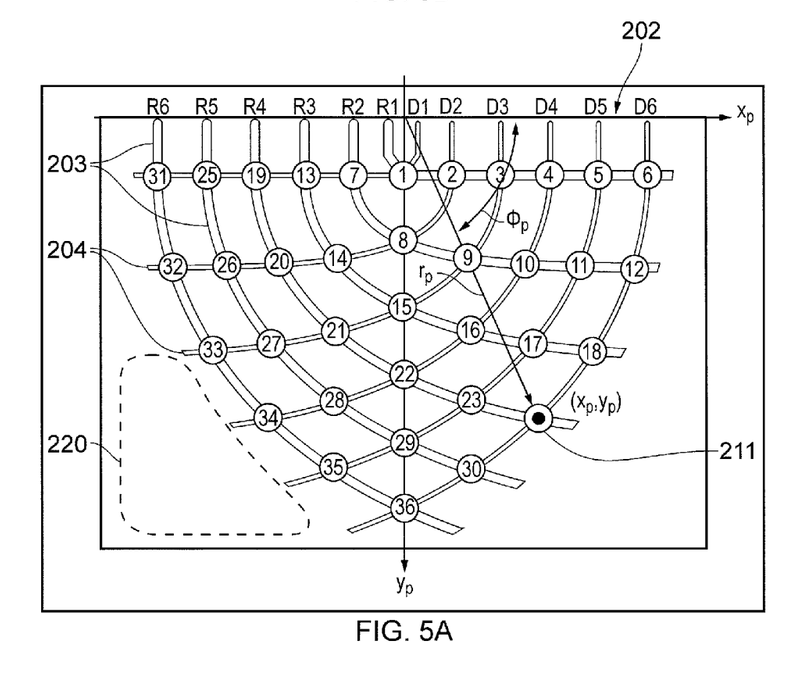
FIGS. 5A and 5B schematically represent some aspects of a mutual-capacitance touch sensor according to an embodiment of the invention and a coordinate space for reported positions relative to the electrodes.
Figure 5B:
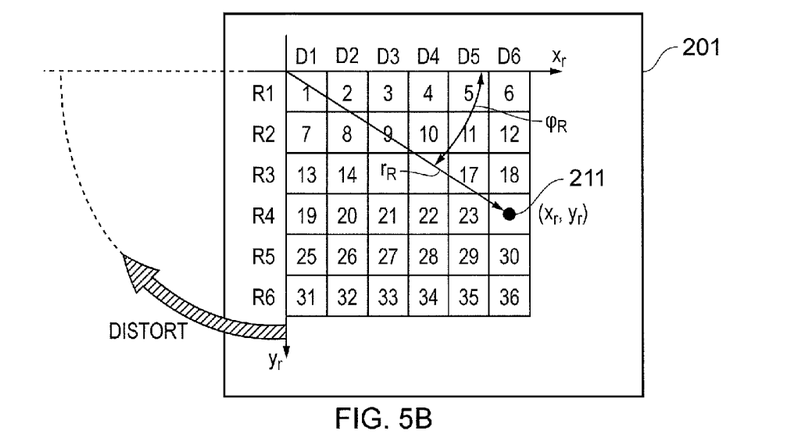

FIGS. 5A and 5B schematically represent some aspects of a mutual-capacitance touch sensor according to an embodiment of the invention.

FIG. 5A represents an electrode pattern comprising a first array of six drive electrodes 204 (D1 to D6) and a second array of six receive electrodes 203 (R1 to R6) arranged to cross one another on a physical sensing surface 202 to provide 36 sensing nodes at the respective intersections between respective ones of the drive and receive electrodes. The sensor may be manufactured in accordance with any known techniques for providing touch sensor electrodes on a suitable substrate/physical surface. For example, the electrode pattern may be formed on a substrate in accordance with known technologies and using conventional materials according to the implementation at hand for (example, whether the sensor is to be transparent or opaque, and so forth).

Signals applied to and measured from the electrodes D1 to D6 and R1 to R6 may be controlled by a conventional-type touch-sensor controller, such as might be used for driving the conventional touch sensor schematically represented in FIG. 4 in order to establish the locations of touches/objects relative to the electrodes in a broadly conventional fashion. Thus, a controller coupled to the electrodes is arranged to output an estimated position for a touch/object in a reported coordinate space as schematically represented in FIG. 5B (i.e. the conventionally-operating controller operates according to an assumption the nodes are arranged on a regular Cartesian grid as is conventional, although in fact they are not). In effect, and as discussed above, the controller is configured to establish where an object is located relative to the drive electrodes and the receive electrodes. The locations of objects/touches adjacent the sensing surface represented 202 in FIG. 5A may be defined in a physical-space Cartesian coordinate system, which, in this example, is defined by an x-axis running along the top edge of the sensing surface such as schematically represented in FIG. 5A and a y-axis running vertically through the centre of the sensing surface. Thus, referring to FIG. 5A, a representation of a touch 211 adjacent sensing node 24 is schematically represented as being at physical coordinates $(x_p, y_p)$. Generally speaking, it is the location of a measured touch position in a physical coordinate system which is of primary interest for a device in which the touch sensor is incorporated. However, a controller coupled to the electrodes will initially establish the location of the touch in a reported-space coordinate system defined relative to the electrodes. Thus a controller coupled to the sensor represented in FIG. 5A will establish the location of the touch 211 as being at coordinates $(x_r, y_r) = (6,4)$ in the reported coordinate system represented in FIG. 5B—i.e. adjacent the intersection of drive electrode D6 and receive electrode R4.

As discussed above, a significant aspect of the electrode pattern in FIG. 5A is that the electrodes are not arranged on a regular Cartesian grid, but are non-linear within the plane of the sensing area. A result of this arrangement is that a physical location of an object adjacent the sensing area in a physical coordinate system defined relative to the "real world" sensing surface, for example in the physical Cartesian coordinate system $(x_p, y_p)$ discussed above, does not linearly map to a reported position in the reported coordinate system $(x_r, y_r)$ with fixed scaling.

In the example of FIG. 5A, respective ones of the drive electrodes D1 to D6 and the receive electrodes R1 to R6 follow generally arcuate paths within the sensing surface defined by the sensing nodes (the sensing surface is the area over which the touch sensor is sensitive to position, and as such is generally bound by the outermost sensing nodes). As discussed above, the electrode pattern for the sensing surface evident in FIG. 5A is in effect a "distorted" version of a regular Cartesian grid electrode pattern such as represented in FIG. 5B. In accordance with an embodiment of the invention a position of a touch in a reported coordinate system $(x_r, y_r)$ may be converted to a position for the touch in a physical coordinate system $(x_p, y_p)$ by taking account of the nature of the distortion. This may be achieved based on a mapping between locations in the physical coordinate system and corresponding locations in the reported coordinate system defined relative to the electrodes. The mapping may be defined functionally, in which case the conversion from reported coordinates to physical coordinates may be performed mathematically. In other cases the mapping may be defined through a lookup table.

For the specific example represented in FIG. 5A there is a functional relationship between locations in reported-space defined relative to the electrodes (FIG. 5B) and locations in physical space, the functional relationship being defined according to the specific electrode pattern. This functional relationship is in effect what defines how the regular Cartesian representation of the electrodes in reported space (FIG. 5B) is distorted to the non-linear electrode pattern of the physical sensor (FIG. 5A).

Referring to FIG. 5B a reported location in the reported Cartesian coordinate system $(x_r, y_r)$ can readily be represented as a location in a reported polar coordinate system $(\phi_r, r_r)$. In this example the origin of the reported polar coordinate system is in the same place as the origin of the reported-space Cartesian coordinate system discussed above, i.e. in the top-left of the reported coordinate space where the first drive electrode (D1) and the first receive electrode (R1) intersect to define sensing node number 1. The line of zero-azimuth for the reported polar coordinate space extends along the x-axis for the reported Cartesian coordinate space, as represented in the figure.

Similarly, and referring to FIG. 5A, a physical location in the physical Cartesian coordinate system $(x_p, y_p)$ can readily be represented as a location in a physical polar coordinate system $(\phi_r, r_p)$. In this example the origin of the physical polar coordinate system is in the same place as the origin of the physical-space Cartesian coordinate system discussed above, i.e. in the middle of the top edge of the sensing surface in the vicinity of sensing node number 1. The line of zero-azimuth for the physical polar coordinate space extends rightwards along the x-axis for the physical Cartesian coordinate space, as represented in the figure.

In accordance with the specific example embodiment represented in FIGS. 5A and 5B, the distortion between the reported coordinate space having an assumed regular Cartesian electrode grid and the actual physical coordinate space in which the electrodes are curved is such that a location $(\phi_r, r_r)$ in reported coordinate space corresponds with a location $(\phi_r, r_p)$ in physical coordinate space, where $r_p=r_r$ and $\phi_p=2\phi_r$.

In effect, this distortion broadly corresponds with "fanning out" the reported coordinate system presented in FIG. 5B by "twisting" the reported-space y-axis about the origin so that lines corresponding to the orthogonal x- and y-axes in the reported coordinate space are in line with one another in the physical board. This fanning out is schematically represented by the heavy arrow marked "DISTORT" in FIG. 5B.

Thus, the shapes of the individual electrodes represented in FIG. 5A may be determined by simply applying the above-identified distortion (i.e. doubling the azimuth angle for each location) to a regular grid electrode pattern.

As can be seen in FIG. 5A, a significant aspect of the distortion electrode pattern of FIG. 5A is that connections to the receive electrodes (R1 to R6) and to the drive electrodes (D1 to D6) can be established along a common edge of the sensing surface, namely the top edge in FIG. 5A. Furthermore, these connections may be established within a width which is the same as the widest part of the sensing surface. It will furthermore be appreciated that in accordance with conventional sensing techniques there is no need to establish a connection to the opposite ends of the respective electrodes (i.e. the ends which do not intersect the upper edge of the sensing surface). Accordingly, for the electrode pattern of FIG. 5A there is no requirement for a region adjacent the sensing surface through which to route connections such as seen to the left-hand side of the conventional design represented in FIG. 3.

A conventional controller coupled to a sensor employing the electrode pattern of FIG. 5A will detect and report a location $(x_r, y_r)$ for the touch 211 in reported coordinate space in accordance with conventional techniques. Taking account of the above-described distortion mapping on the basis of which the electrode pattern of FIG. 5A is defined, the reported location $(x_r, y_r)$ may thus be transformed to a physical-space location by simply converting the reported location to reported polar coordinates $(\phi_r=\tan^{-1}(y_r/x_r)$, $r_r=\text{sqrt}(y_r^2+x_r^2))$ and doubling the azimuth angle to generate a location for the touch in physical polar coordinates (i.e. $\phi_p=2\phi_r$; $r_p=r_r$), and then converting these physical polar coordinates to physical Cartesian coordinates, again using simple trigonometry $(x_p=r_p \cos(\phi_p); y_p=r_p \sin(\phi_p))$.

Combining these steps together provides the following equations for establishing physical Cartesian coordinates $(x_p, y_p)$ from reported Cartesian coordinates $(x_r, y_r)$ $$x_p=(y_r^2+x_r^2)^{1/2} \cos(2 \tan^{-1}(y_r/x_r)) \qquad \text{[Equation 1]}$$

$$y_p=(y_r^2+x_r^2)^{1/2} \sin(2 \tan^{-1}(y_r/x_r)) \qquad \text{[Equation 2]}$$

These equations in effect provide physical coordinates in units corresponding to the units used for the reported coordinates. Simple scaling factors may be employed to convert these to other units, for example to centimeters, according to the desired size of the sensing area (typically the units used for reporting physical position will not be based around well-established units, such as centimeters, but will be a digital value, for example corresponding to 1/1024th of the physical width of the sensor). In the more general case the scalings may be different in different directions such that the above equations become:

$$x_p=\alpha(y_r^2+x_r^2)^{1/2} \cos(2 \tan^{-1}(y_r/x_r)) \qquad \text{[Equation 3]}$$

$$y_p=\beta(y_r^2+x_r^2)^{1/2} \sin(2 \tan^{-1}(y_r/x_r)) \qquad \text{[Equation 4]}$$

where $\alpha$ and $\beta$ are the scaling factors for each direction.

These equations also can be used to transform coordinates along respective straight-lines in reported coordinate space corresponding to an assumed regular grid of electrodes in reported coordinate space to corresponding non-linear lines for defining the physical electrode pattern.

Thus a processor arranged to receive the indication of reported position from a conventional controller in the reported coordinate system can readily transform the reported position to an output position in a physical coordinate system based on the non-linear pattern of electrodes by applying processing in accordance with Equations 3 and 4.

Accordingly, by providing a non-linear pattern of electrodes and applying a coordinate transform to a reported position which takes account of the non-linearity is in the pattern of electrodes, a physical touch location can be determined for a touch sensor having a sensor electrode pattern to which all external connections can be established along a common edge of the sensing surface within a width that is no wider than the width of the sensing area.

One aspect of the sensing surface represented in FIG. 5A is that the active sensing surface is not rectangular (i.e. the sensing nodes do not span a rectangular area). For example, a touch or object in the example region 220 identified in dashed out-line falls outside the sensing area.

In some circumstances it may be preferable to provide a sensing surface which more closely resembles a rectangle. This may be achieved in accordance with embodiments of the invention by providing electrode patterns which correspond to different "distortions" of a regular Cartesian grid.

Figure 6A:
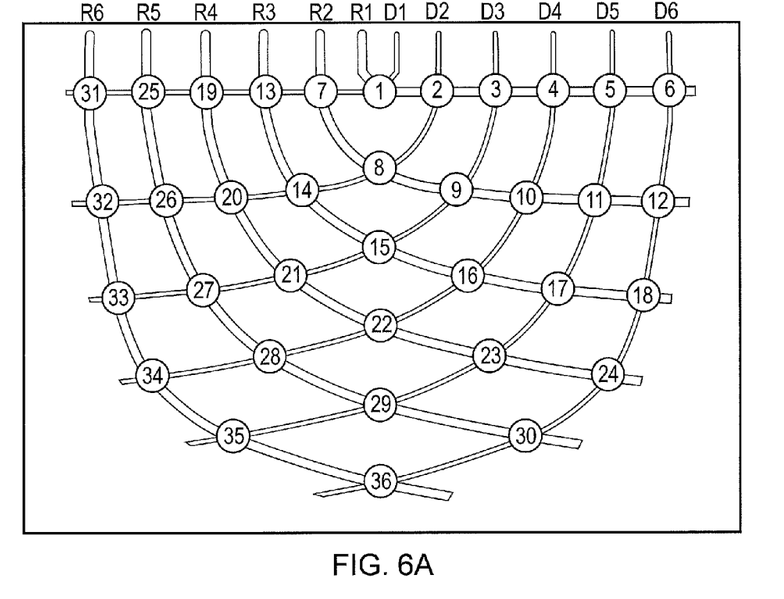
FIGS. 6A and 6B schematically represent some aspects of a mutual-capacitance touch sensor according to another embodiment of the invention and a coordinate space for reported positions relative to the electrodes.
Figure 6B:
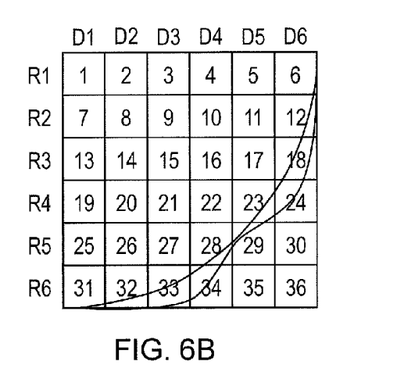

FIGS. 6A and 6B schematically represent aspects of a mutual-capacitance touch sensor according to another embodiment of the invention. These figures are similar to, and will be understood from, the corresponding FIGS. 5A and 5B and the common aspects of the two sensors will not be described again in detail in the interest of brevity. The sensing surface of FIG. 6A differs from the sensing surface of FIG. 5A by being based on a different mapping between reported coordinates and physical coordinates (i.e. there is a different "distortion" of the regular Cartesian grid assumed by the controller chip coupled to the electrodes). In particular, the distortion is modified so as to provide sensing nodes that span a more rectangular region. For example, sensing node 35 in FIG. 6A is located further from the vertical central line of the sensing area that the corresponding sensing node in the electrode pattern of FIG. 5A, thereby in effect extending the active sensing area to a greater width in the lower part of the sensing surface.

As with the electrode pattern of FIG. 5A, the electrode pattern of FIG. 6A is such that the transform from reported coordinates to physical coordinates is based on a mathematical function—that is to say, the electrode pattern is formulaically defined. For the example of FIG. 6A the transform equations corresponding to Equations 3 and 4 above are as follows:

$$x_p = x_p'(1 + \delta y_p'^3)$$ [Equation 5]

$$y_p = y_p'(1 + \mu x_p'^2 y_p'^2)$$ [Equation 6]

where $x_p'$ and $y_p'$ correspond with $x_p$ and $y_p$ determined in accordance with Equations 3 and 4 above, and $\delta$ and $\mu$ are parameters which can be chosen to modify the extent to which the sensing nodes are "pushed" towards a more rectangular shape.

It will be appreciated that by providing non-linear electrode patterns in accordance with embodiments of the invention the separations between neighbouring sensing nodes will generally not be constant. For example, referring to FIG. 6A the separation between sensing nodes numbered 30 and 36 is significantly larger than the separation between sensing nodes numbered 31 and 25. As a consequence, the sensing resolution may be different in different parts of the sensing surface. In some cases, for example with multi-touch sensing, there can be a desire for sensing resolution to be above a given threshold to allow multiple touches to be separated across a full-screen. If this is desired, one can simply ensure the largest separation between sensing nodes is small enough to provide the desired resolution (taking account of the available interpolation precision), even though this means the resolution may be significantly higher than needed in other parts of the sensing surface. If necessary this can be achieved by simply increasing the number of electrodes used to define the sensing surface.

Figure 7:
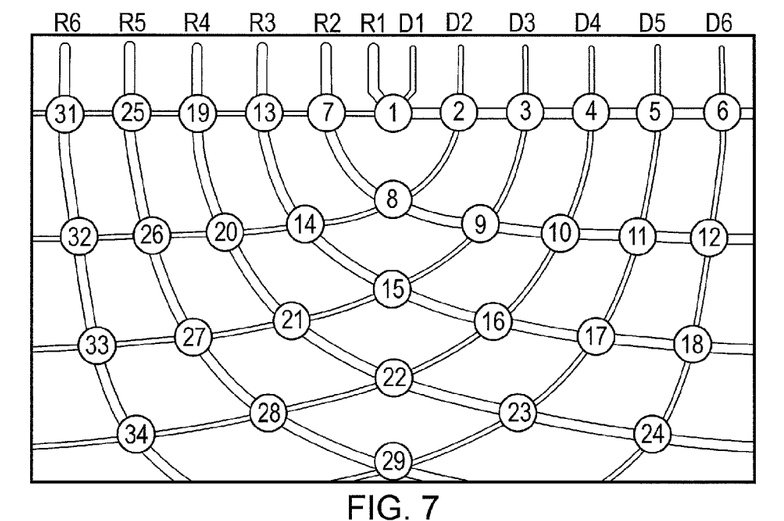
FIGS. 7 to 9 schematically represent example electrode patters for touch sensors according to other embodiments of the invention.

Another technique which can be used to provide a more-rectangular sensing area is to in effect truncate a lower part of a sensing surface of the kind represented in FIGS. 5A and 6A. Such a sensing surface is schematically represented in FIG. 7. FIG. 7 is similar to, and will be understood from, FIGS. 5A and 6A and the common aspects of these sensors will not be described again in detail in the interest of brevity. The electrode pattern of the sensing surface of FIG. 7 is broadly based on the sensing surface of FIG. 6A (i.e. based on Equations 5 and 6 above), but is truncated below sensing node 29 to in effect remove that part of the sensing area of FIG. 6A which is most restricted in width. This has the advantage of providing a more-rectangular sensing area, but at the cost of losing some sensing ability in that the sensing nodes 30, 35, 36 for the sense of FIG. 6A are not available for sensing.

Figure 8:
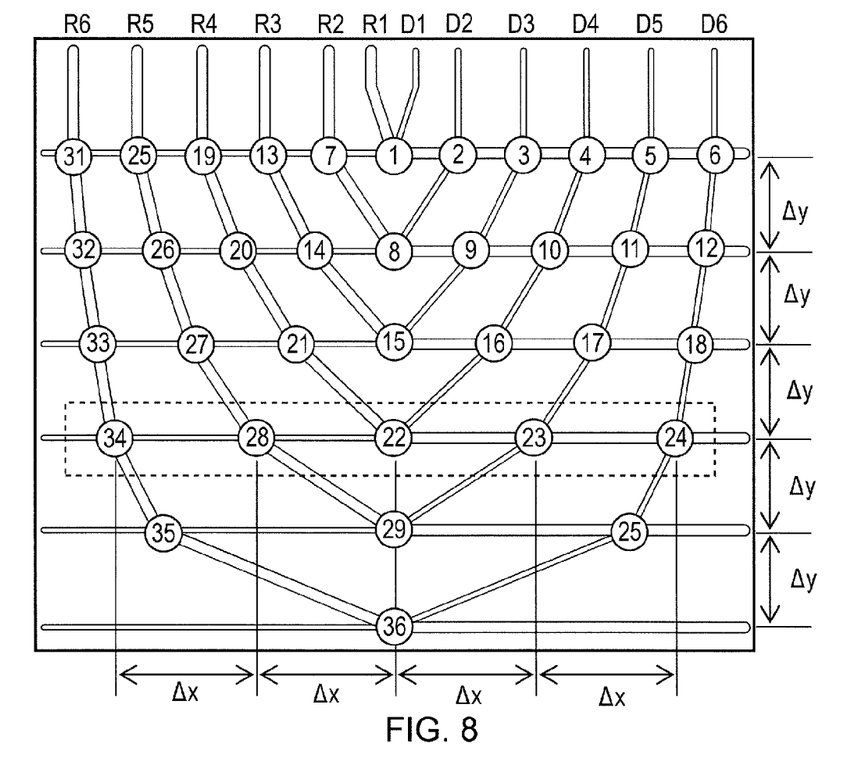

In the above examples there has been a closed-form mathematical relationship for relating reported positions to physical positions, and hence also for defining the layout of electrodes. However, this is not necessarily the case for other embodiments. In some cases the electrodes may be arranged to provide sensing nodes at tabulated locations such that a transform from reported positions to physical positions can be established by reference to a corresponding lookup table. Such a sensing surface is schematically represented in FIG. 8. FIG. 8 is generally similar to, and will be understood from, FIGS. 5A, 6A and 7, and the common aspects of these sensors will not be described again in detail in the interest of brevity.

In the example of FIG. 8, the 36 sensing node locations are arranged in a pattern which is generally similar to that of FIG. 6A, but in which the sensing nodes are constrained to lie along horizontal straight lines on the physical sensing surface (parallel to the physical coordinate system x-axis). These horizontal lines are evenly spaced in the physical coordinate system and are separated by $\Delta y$. Furthermore the sensing nodes lying on each of these horizontal straight lines are equally spaced by an amount $\Delta x$. (The sensing nodes on different straight lines are differently spaced because of the different numbers of sensing nodes—i.e. $\Delta x$ is not the same along each horizontal sensing line).

A lookup table may thus be defined which specifies the physical coordinates of each sensing node on the physical sensing surface. As discussed above, a conventional controller chip will generally report an interpolated position having a resolution greater than the separation between electrodes. Accordingly, it is likely that the exact position reported by controller chip will not correspond exactly with an entry in the lookup table. Thus, in accordance with an embodiment of the invention, a processor receiving the reported position in a reported coordinate system may be configured to determine the four nearest sensing nodes for a reported "fractional" position. This can readily be determined from the rounded-up and rounded-down values of the two coordinates for the reported position. For example, if a reported position is $(x_r, y_r) = (4.3, 5.2)$, the four nearest sensing nodes are those numbered 28, 29, 34, 35 in the numbering scheme of FIG. 6B. The processor may then establish the physical locations for these four nearest sensing nodes by reference to the lookup table setting out the physical locations of the sensing nodes (electrode crossing points) and determine an interpolated physical position from the four physical locations of the nearest sensing nodes based on the fractional part of the reported position.

With this lookup table approach the electrode patterns can be chosen freely (because they are not constrained to follow any particular mathematical form) and in some cases provide a more uniform response (sensing resolution) over a desired shape sensing area.

Figure 9:
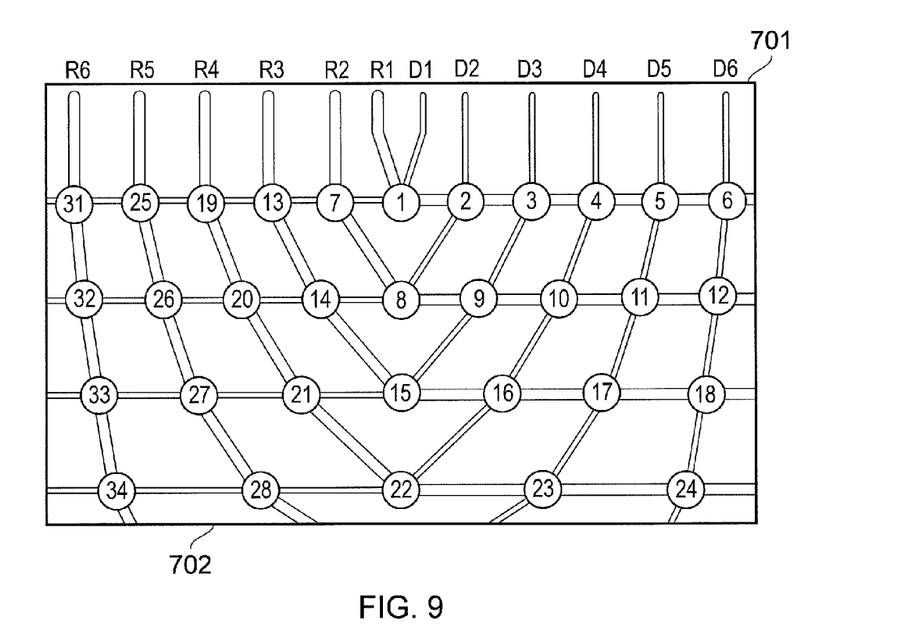

It will be appreciated that a sensing area of the type represented in FIG. 8 can also be truncated in much the same way as a truncated example of the sensing area of FIG. 6A is schematically shown in FIG. 7. Such a truncated-version of the sensing area of FIG. 8 is schematically shown in FIG. 9.

Figure 10:
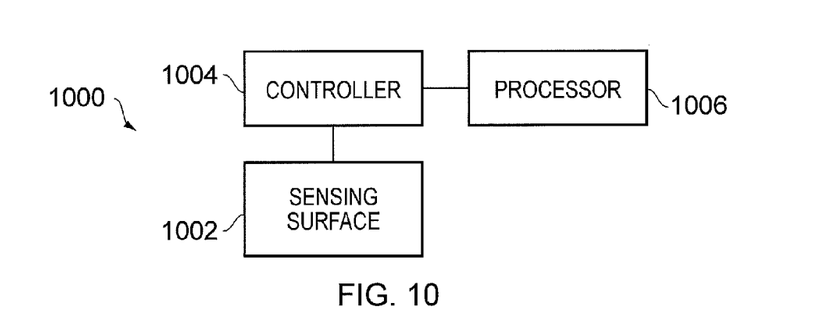
FIG. 10 schematically represents elements of a touch sensor according to an embodiment of the invention.

In some example embodiments respective ones of electrodes may have non-uniform widths along their lengths in the plane of the sensing surface. This can be helpful in some cases because touch controllers typically interpolate touch positions by taking into account the signals from several neighbouring electrode nodes. For conventional electrode designs with linear, parallel electrodes, the nodes are regularly spaced at a pitch typically designed to facilitate accurate interpolation for the implementation at hand. In embodiments of the current invention electrode nodes are not generally equally spaced and so the accuracy of interpolation may not be the same in the vicinity of different nodes. If this is considered an issue the shape of the electrodes may be varied from node to node so the range of interpolation accuracies throughout the sensor is improved. One way to do this may be to make the electrodes wider for nodes that are more widely spaced, although there are various other modifications that can achieve the same goal of reducing variations in position sensing accuracy across a sensing surface due to variations in node/electrode spacing. For example, in some embodiments each electrode might consist of two quasi-parallel wires which vary in their spacing FIG. 10 schematically shows some components of a touch sensor 1000 according to an embodiment of the invention. The sensor 1000 comprises a sensing surface 1002, for example in accordance with any of the embodiments of the invention such as discussed above, coupled to a controller chip 1004. The controller chip 1004 may, for example, be a conventional "off the shelf" controller chip configured to determine the occurrence of and report a location of a touch using conventional capacitive sensing techniques. The sensor 1000 further comprises a processor 1006 arranged to receive a reported position estimate from the controller 1004 and to convert the reported position estimate to a physical position estimate in accordance with the above-describe techniques. The processor 1006 may, for example, comprise a suitably programmed general purpose microprocessor, or field programmable gate array, or an application specific integrated circuit. Furthermore, although presented in FIG. 10 as two separate elements, it will be appreciated the functionality of the controller 1004 and the processor 1006 may be provided in a single element, for example, a single suitably-programmed microprocessor.

It will be appreciated that whilst the above-described examples have focused on an electrode pattern comprising six drive and six receive electrodes, this is purely for the sake of example, and in general there could of course be any number of electrodes, as with conventional sensing techniques.

Whilst the above-described embodiments of the invention have primarily focused on touch sensors employing capacitive sensing technologies, and in particular those based on driven and receive electrode based technologies (mutual-capacitance), it will be appreciated that similar considerations apply for sensors employing other capacitive sensing technologies (such as self-capacitance based sensors) or, indeed, touch sensors based on other technologies, such as resistive screen sensors. More generally, embodiments of the invention can be applied to any sensor technology in which sensing is performed by measuring an electrical parameter associated with electrodes. This is because embodiments of the invention may in some respects be seen as being based on providing a "distorted" electrode pattern to provide a spatial mapping between a physical touch position and a reported touch position which is nonlinear, and this principle applies regardless of the underlying technology for establishing the reported touch position.

Thus, a touch-sensitive position sensor is disclosed. The sensor comprises an array of first electrodes and an array of second electrodes arranged in a pattern to provide a sensing surface, wherein at least some of the first electrodes and the second electrodes are arranged to follow paths which are non-linear within the sensing surface such that there are ends of the first electrodes and ends of the second electrodes which meet a common edge of the sensing surface. A controller is coupled to respective ones of the first electrodes and the second electrodes and arranged to determine a reported position for an object adjacent the sensing surface by measuring changes in an electrical parameter e.g. capacitance or resistance, associated with the first electrodes and the second electrodes which is caused by the presence of the object. The controller is further operable to provide an indication of the reported position in a first coordinate system defined relative to the first electrodes and the second electrodes, the sensor further comprises a processor arranged to receive the indication of reported position from the controller in the first coordinate system and to transform the reported position to an output position in a second coordinate system, wherein the transform is based on the non-linear pattern of electrodes. Thus, a sensor having electrodes which are distorted so as to meet a common edge may be provided for ease of connectability, with the distortion been accounted for through the transform performed by the processor.

The invention claimed is:

1. A touch-sensitive position sensor comprising:
an array of first electrodes and an array of second electrodes arranged in a pattern to provide a sensing surface, wherein at least some of the first electrodes and the second electrodes are arranged to follow paths which are non-linear within the sensing surface such that there are ends of the first electrodes and ends of the second electrodes which meet a common edge of the sensing surface;
a controller coupled to respective ones of the first electrodes and the second electrodes and arranged to determine a reported position for an object adjacent the sensing surface by measuring changes in an electrical parameter associated with the first electrodes and the second electrodes which is caused by the presence of the object, and to provide an indication of the reported position in a first coordinate system defined relative to the first electrodes and the second electrodes;
a processor arranged to receive the indication of reported position from the controller in the first coordinate system and to transform the reported position to an output position in a second coordinate system, wherein the transform is based on the non-linear pattern of electrodes, and
wherein the sensing surface spans a plurality of nodes at locations where respective ones of the first and second electrodes cross, and wherein the separations between adjacent nodes are different for different locations on the sensing surface.

2. A touch-sensitive position sensor according claim 1, wherein the processor is configured to transform the reported position to an output position based on a lookup table relating a plurality of possible reported positions to a plurality output positions.

3. A touch-sensitive position sensor according to claim 1, wherein the processor is configured to transform the reported position to an output position according to a mathematical function associated with the pattern of electrodes.

4. A touch-sensitive position sensor according to claim 1, wherein the common edge of the sensing surface is a first edge of the sensing surface and the ends of the first electrodes and ends of the second electrodes which meet the first edge of the sensing surface are first ends of respective ones of the first electrodes and first ends of respective ones of the second electrodes, and wherein second ends of the respective ones of the first electrodes meet a second edge of the sensing surface and second ends of the respective ones of the second electrodes meet a third edge of the sensing surface which is opposite to the second edge of the sensing surface.

5. A touch-sensitive position sensor according to claim 1, wherein at least some of first electrodes do not cross with at least some of the second electrodes which do cross with other ones of the first electrodes.

6. A touch-sensitive position sensor according to claim 1, wherein respective ones of the first electrodes and the second electrodes have a non-uniform width in the plane of the sensing surface which varies in dependence on a distance from the common edge of the sensing surface.

7. A touch-sensitive position sensor according to claim 1, wherein respective ones of the first electrodes and the second electrodes have a non-uniform width in the plane of the sensing surface which varies in dependence on a distance along the selective electrodes between pairs of nodes.

8. A touch-sensitive position sensor according to claim 1, wherein respective ones of the first electrodes and/or respective ones of the second electrodes follow generally arcuate paths within the sensing surface.

9. A touch-sensitive position sensor according claim 8, wherein the generally arcuate paths within the sensing surface have an extent of around 90°.

10. A touch-sensitive position sensor according to claim 1, wherein the electrical parameter relates to a capacitive coupling associated with the respective electrodes.

11. A touch-sensitive position sensor according to claim 10, wherein the capacitive coupling is a capacitive coupling between respective ones of the first electrodes and respective ones of the second electrodes.

12. A touch-sensitive position sensor according to claim 1, wherein the electrical parameter relates to a resistance associated with the electrodes.

* * * * *